United States Patent
Limaye et al.

(10) Patent No.: US 11,880,457 B2
(45) Date of Patent: Jan. 23, 2024

(54) DEVICE INTRUSION DETECTION VIA VARIABLE CODE COMPARISON

(71) Applicant: Micron Technology, Inc., Boise, ID (US)

(72) Inventors: Aparna U. Limaye, Boise, ID (US); Diana C. Majerus, Boise, ID (US); Rachael R. Carlson, Meridian, ID (US); Shea M. Morrison, Boise, ID (US); Debra M. Bell, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 520 days.

(21) Appl. No.: 16/586,097

(22) Filed: Sep. 27, 2019

(65) Prior Publication Data
US 2021/0097180 A1 Apr. 1, 2021

(51) Int. Cl.
*G06F 21/56* (2013.01)
*G06F 3/06* (2006.01)

(52) U.S. Cl.
CPC .......... *G06F 21/563* (2013.01); *G06F 3/0622* (2013.01); *G06F 3/0659* (2013.01); *G06F 3/0673* (2013.01); *G06F 21/566* (2013.01); *G06F 2221/033* (2013.01)

(58) Field of Classification Search
CPC .... G06F 21/563; G06F 3/0622; G06F 3/0659; G06F 3/0673; G06F 21/566; G06F 2221/033
See application file for complete search history.

(56) References Cited

U.S. PATENT DOCUMENTS

| | | | |
|---|---|---|---|
| 5,600,303 A | 2/1997 | Husseiny et al. | |
| 6,883,717 B1* | 4/2005 | Kelley | G07F 7/1008 |
| | | | 235/492 |
| 7,463,590 B2 | 12/2008 | Mualem et al. | |
| 8,544,089 B2* | 9/2013 | Jakobsson | G06F 21/566 |
| | | | 713/193 |
| 8,689,357 B2* | 4/2014 | Arora | G06F 21/755 |
| | | | 726/34 |
| 8,712,052 B2* | 4/2014 | Landheer | H04L 63/1441 |
| | | | 380/263 |
| 9,921,978 B1* | 3/2018 | Chan | G06F 3/0622 |
| 10,050,983 B2* | 8/2018 | Xia | H04L 63/0245 |
| 10,291,398 B2* | 5/2019 | Kanemoto | H04L 63/0442 |
| 2005/0265349 A1* | 12/2005 | Garg | H04L 65/65 |
| | | | 370/395.2 |
| 2007/0289019 A1 | 12/2007 | Lowrey | |

(Continued)

OTHER PUBLICATIONS

International Search Report and Written Opinion for related PCT Application No. PCT/US2020/046131, dated Aug. 13, 2020, 13 pages.

*Primary Examiner* — Saleh Najjar
*Assistant Examiner* — Devin E Almeida
(74) *Attorney, Agent, or Firm* — Brooks, Cameron & Huebsch, PLLC

(57) ABSTRACT

Apparatuses and methods related to detecting synchronization between multiple devices. The security of a device may be compromised if the device receives commands from unauthorized sources. A state of a device can be affected by the commands the device receives. A different device can determine whether there is synchronicity between device and the different device to determine whether the security of the device may have been compromised.

20 Claims, 7 Drawing Sheets

(56) References Cited

U.S. PATENT DOCUMENTS

| | | | |
|---|---|---|---|
| 2010/0192014 A1* | 7/2010 | Mejdrich | G06F 11/263 714/E11.177 |
| 2013/0145106 A1* | 6/2013 | Kan | G06F 3/0659 711/147 |
| 2013/0282927 A1* | 10/2013 | Zhao | G06F 3/0688 710/4 |
| 2014/0380469 A1 | 12/2014 | Chen et al. | |
| 2015/0316900 A1* | 11/2015 | Schaffrath | G08C 17/02 700/12 |
| 2016/0026829 A1* | 1/2016 | Brocker | G06F 21/87 726/34 |
| 2016/0062921 A1 | 3/2016 | Kim et al. | |
| 2021/0126788 A1* | 4/2021 | Kitazawa | G09C 1/00 |

\* cited by examiner

US 11,880,457 B2

DEVICE INTRUSION DETECTION VIA VARIABLE CODE COMPARISON

TECHNICAL FIELD

The present disclosure relates generally to memory, and more particularly to apparatuses and methods associated with device intrusion detection via variable code comparison.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, a memory system may receive commands from multiple sources. Some commands may be authorized while other commands are unauthorized.

DETAILED DESCRIPTION

Figure 1:
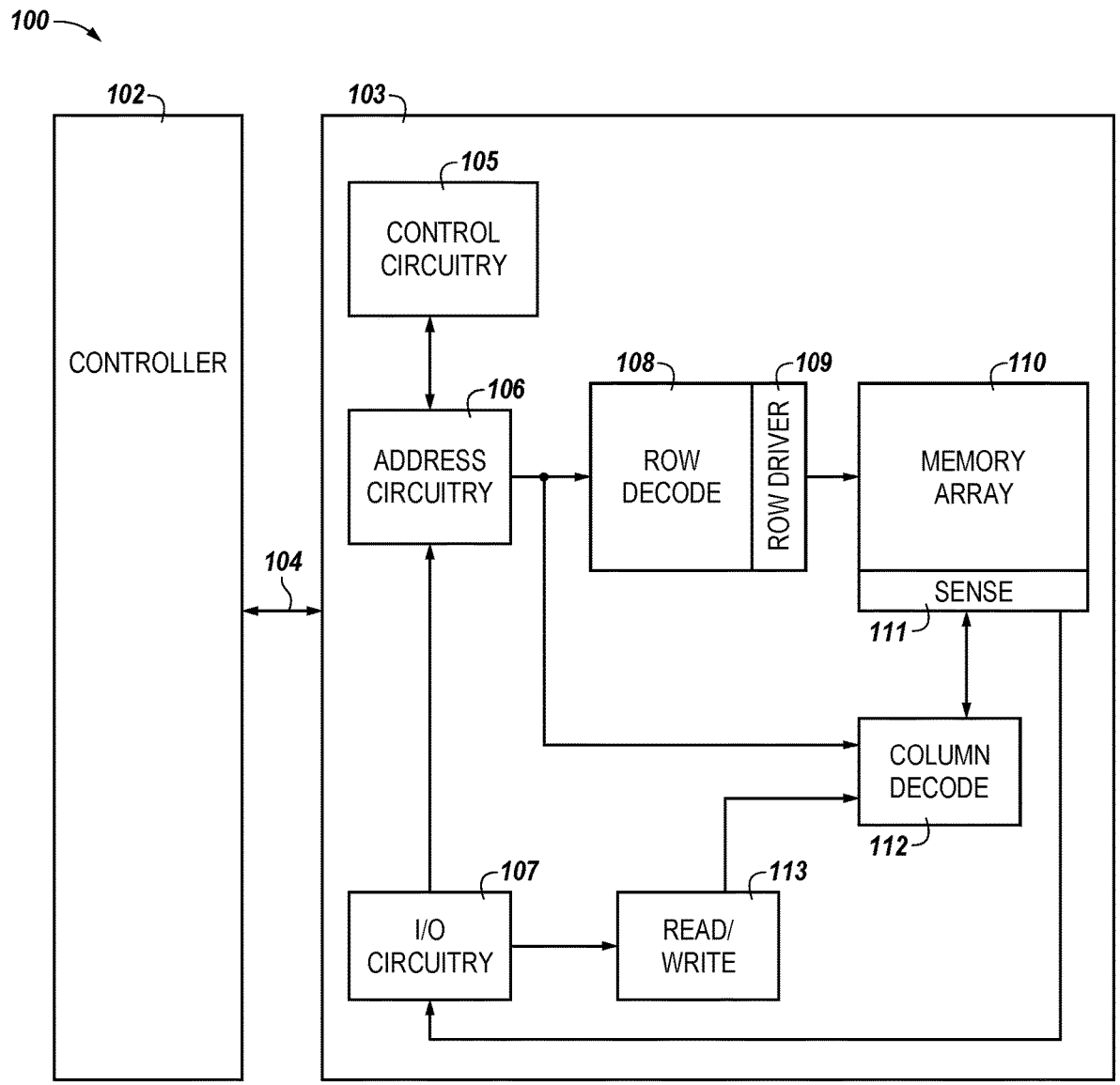
FIG. 1 is a block diagram of an apparatus in the form of a computing system including a memory device in accordance with a number of embodiments of the present disclosure.

The present disclosure includes apparatuses and methods related to detecting device intrusion via variable code comparison. In a number of examples, devices may experience security threats. It may be desirable to identify which devices may have experienced such security threats.

As used herein, an example of a security threat is an unauthorized use of a device such as a memory device, IoT (Internet of Things) device, CPU (central processing unit), etc. For example, an unauthorized use of a device can include causing the device to process an unauthorized command. Unauthorized commands can include commands provided by a source that is not authorized to provide commands to the device.

In some examples, a first device can be identified as having experienced a security threat if the device has received and/or processed commands which are unauthorized. The commands received by the first device may be deemed unauthorized if the received command changes a state of the first device. The state of the first device can be verified by a second device. The second device can be authorized to provide commands to the first device. The state of the first device can mirror a state of the first device. The state of the first device and the second device can be dependent on the generation of the commands and the receipt of the commands.

For instance, the first device may generate and provide a command to the second device. Generating and/or providing the command to the second device may contribute to the state of the second device or to a portion of the second device. The receiving and/or processing of the command by the first device may alter the state of the first device such that the state of the first device mirrors the state of the second device or the state of the second device mirrors the state of the first device. Receipt and/or processing of commands by the second device that were not received from the first device may alter the state of the second device without altering the state of the first device. The state of the second device may be inconsistent with the state of the first device such that the first device may identify the second device as having experienced a security threat.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 103 in accordance with a number of embodiments of the present disclosure. As used herein, a memory device 103, a memory array 110, and/or a controller 102, for example, might also be separately considered an "apparatus."

In this example, system 100 includes a controller 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Controller 102 may be a system controller of a memory system comprising multiple memory devices 103, with the system controller 102 providing access to the respective memory devices 103 by a processing resource such as a central processing unit (CPU). The controller 102 can be a host which can include a number of processing resources (e.g., one or more processors, microprocessors, or some other type of controlling circuitry) capable of accessing memory 103. The system 100 can include separate integrated circuits, or both the controller 102 and the memory device 103 can be on the same integrated circuit.

Figure 2:
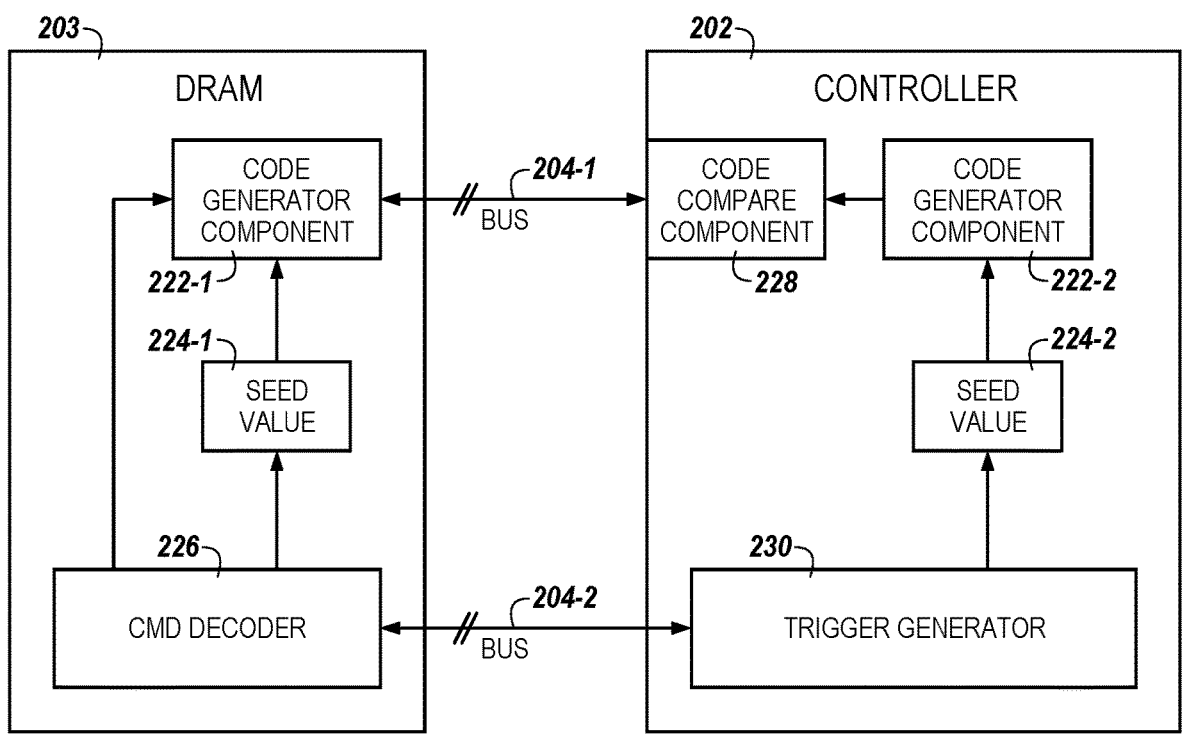
FIG. 2 is a block diagram of an apparatus in the form of a computing system comprising a memory device and a controller in accordance with a number of embodiments of the present disclosure.
Figure 3:
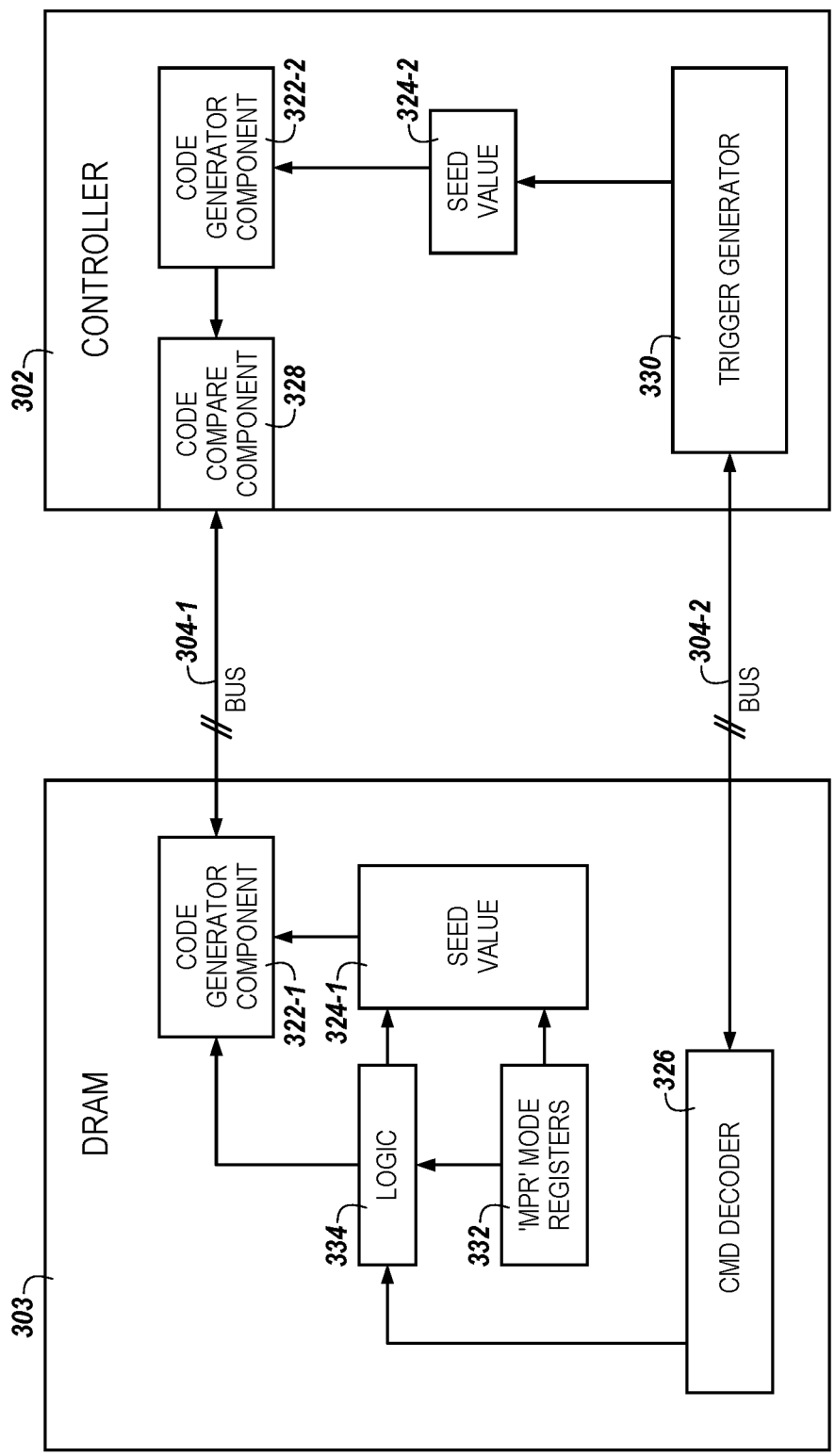
FIG. 3 is a block diagram of an apparatus in the form of a computing system comprising a memory device and a controller in accordance with a number of embodiments of the present disclosure.

The controller 102 can be responsible for providing access to a host. The controller 102 can provide commands to the memory device 103. The controller 102 can also determine whether other devices (e.g., unauthorized devices) have provided commands to the memory device 103. The controller 102 can determine whether other devices have provided commands to the memory device 103 by analyzing the state of the memory device 103 and/or a state of a portion of the memory device 103. The state of the memory device 103 can be affected by the commands that the memory device 103 receives and/or processes. The controller 102 can analyze the state of the memory device 103 by comparing the state of the memory device 103 to a state of the controller 102 and/or a portion of the controller 102. The state of the controller 102 and/or a portion of the controller 102 can be affected by the commands that the controller 102 provides to the memory device 103. FIGS. 2 and 3 describe the relationship between commands and the state of the controller 102 and/or the memory device 103.

For clarity, the system 100 has been simplified to focus on features with particular relevance to the present disclosure. The memory array 110 can be a DRAM array, SRAM array, STT RAM array, PCRAM array, TRAM array, RRAM array, NAND flash array, and/or NOR flash array, for instance. The array 110 can comprise memory cells arranged in rows coupled by access lines (which may be referred to herein as word lines or select lines) and columns coupled by sense lines (which may be referred to herein as digit lines or data lines). Although a single array 110 is shown in FIG. 1, embodiments are not so limited. For instance, memory device 103 may include a number of arrays 110 (e.g., a number of banks of DRAM cells).

The memory device 103 includes address circuitry 106 to latch address signals provided over an interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z, CCIX, or the like. Address signals are received and decoded by a row decoder 108 and a column decoder 112 to access the memory array 110. Data can be read from memory array 110 by sensing voltage and/or current changes on the sense lines using sensing circuitry 111. The sensing circuitry 111 can comprise, for example, sense amplifiers that can read and latch a page (e.g., row) of data from the memory array 110. The I/O circuitry 107 can be used for bi-directional data communication with controller 102 and/or a host over the interface 104. The read/write circuitry 113 is used to write data to the memory array 110 or read data from the memory array 110. As an example, the circuitry 113 can comprise various drivers, latch circuitry, etc.

Control circuitry 105 decodes signals provided by the controller 102. The signals can be commands provided by the controller 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the controller 102. The control circuitry 105 can comprise a state machine, a sequencer, and/or some other type of control circuitry, which may be implemented in the form of hardware, firmware, or software, or any combination of the three. In some examples, the controller 102 can be a controller external to the memory device 103. The control circuitry 105 can be internal to the memory device 103. The controller 102 can be a memory controller which is coupled to a processing resource of a computing device.

FIG. 2 is a block diagram of an apparatus in the form of a computing system comprising a memory device 203 and a controller 202 in accordance with a number of embodiments of the present disclosure. The controller 202 and the memory device 203 are analogous to the controller 102 and the memory device 103 in FIG. 1.

The memory device 203 comprises a code generator component 222-1, a command decoder 226, and register 224-1 to store a seed value which can be referred to as seed value 224-1. In some examples, the command decoder 226 can be part of the control circuitry 105 or can be independent of the control circuitry 105 in FIG. 1. As used herein, the code generator components 222-1 and 222-2 can also be referred to as code generators.

The controller 202 comprises code generator component 222-2, a register 224-2 to store a seed value which can be referred to as seed value 224-2, a code compare component 228, and a trigger generator 230. The memory device 203 and the controller 202 can communicate via a bus 204-1 and a bus 204-2. For example, the controller 202 can provide commands to the memory device 203 via the bus 204-1 and the memory device 203 can provide code via the bus 204-1. As used herein, the components describe can also be implemented as circuitry.

The buses 204-1 and 204-2 can be bi-directional buses. Although shown as bidirectional buses the buses 204-1 and 204-2 can also be implemented as unidirectional buses. The buses 204-1 and 204-2 can be implemented as command buses, address buses, and/or data buses, among other types of buses. The buses 204-1 and 204-2 can also represent interfaces in instances where the device 203 and the device 202 are implemented as memory devices.

The code generators 221-1 and 221-2 can be, for example, linear feedback shift registers (LFSRs) that can output pseudo-random numbers based on a seed value; however, embodiments are not so limited. For example, the code generators 221-1 and 221-2 can comprise other types of pseudo random code generators such as random cycle bit generators, permuted congruential generators, etc. As described further herein, the code generators 221-1 and 221-2 can be the same such that their outputs are configured to match for a given seed value and increment value. As used herein, an increment value can be a value that is combined with a seed value. That is, incrementing both code generators by one, for example, will yield the same output result. In a number of embodiments, the codes generated by code generators 221-1 and 221-2 can be used as keys and compared to detect synchronization of devices on which they reside. As such, an example of a code can be a key. As used herein, synchronization describes that the states of the code generator components match such that the code generator components generate a same code.

For example, the memory device 203 and the controller 202 can be considered to be synchronized when the codes generated by the code generators 222-1 and 221-2 match. The code generator 222-2 can change states based on the commands generated by the trigger generator 230. The code generator 222-1 can change states based on the commands received by the command decoder 226. The states of the code generators 222-1 and 222-2 can be based on the commands generated by the controller 202 and/or the commands received by the memory device 203.

The code generator 222-1 can be coupled to the command decoder 226 such that the command decoder 226 can trigger the code generator 222-1 to change states. The command decoder 226 can trigger the code generator 222-1 based on a number of factors associated with the commands received by the memory device 203. For example, the command decoder 226 can trigger the code generator 222-1 every time a command is received, based on a quantity of commands received, and/or based on a type of command received. For instance, the command decoder 226 can trigger a change in the state of the code generator 222-1 after receiving a quantity of commands at the memory device 203 or every time a read or write command is received.

The command decoder 226 can further process commands to set the seed value 224-1. For example, the controller 202 can provide a command to set the seed value 224-1. The command provided to set the seed value 224-1 can be accompanied by a value (e.g., seed value). The command decoder 226 can store the seed value in a register 224-1 that stores seed values. Upon updating the seed value 224-1, the code generator 222-1 can utilize the seed value to generate a number rather than utilizing a last state of itself to generate the code.

The seed value can be encrypted or unencrypted. For instance, the seed value can be received by the memory device 103 as an encrypted seed value or an unencrypted seed value. If the seed value received by the memory device 103 is unencrypted, then the command decoder 226 or different circuitry can encrypt the received seed value such that an encrypted seed value is stored in the register 224-1. The register described herein including the register 224-1 and/or the register 224-2 can be mode registers. An encrypted seed value can also be received by the memory device 203. The encrypted seed value can be stored in the register 224-1 and/or may be additionally processed to further perform encryption on the already encrypted seed value received by the memory device 203.

Triggering the code generator 222-1 can include causing the code generator 222-1 to generate a pseudo random number. The code generator 222-1 can utilize the triggering command to change the state of the code generator 222-1. The triggering command can be a command that caused the command decoder 226 to provide the trigger to the code generator 222-1.

The code generator 222-1 and/or the command decoder 226 may receive commands from a number of sources and may trigger the code generator 222-1 regardless of the source of the received commands. The code generated by the code generator 222-1 may reflect the commands received by the memory device 203.

The code generator 222-2 can be used to generate a code reflecting the commands the controller 202 provides to the memory device 203. The code generators 222-1 and 222-2 can be different instances of a same circuitry such that given the same input both the code generators 222-1 and 222-2 generate the same code.

The trigger generator 230 can be coupled to the register 224-2 that stores a seed value (e.g., seed value 224-2) and/or the code generator 222-2. The trigger generator 230 can generate commands and can trigger the code generator 222-2 based on the commands generated. The triggering of the code generator 222-2 and the code generator 222-1 can be based on a same criteria by both the command decoder 226 and the trigger generator 230. The criteria used to trigger the code generator 222-1 and 222-2 can define the types of commands and/or the frequency of commands used to trigger the code generators 222-1 and 222-2. Utilizing the same criteria to trigger the code generators 222-1 and 222-2 allows for both of the code generators 222-1 and 222-2 to be synchronized resulting in a same code being generated if no additional commands are received by the memory device 203.

If the memory device 203 receives commands that are from sources other than the controller 202, then the code generated by the memory device 203 may not be the same code generated by the controller 202 because states of the code generators 222-1 and 222-2 may differ. The states of the code generators 222-1 and 222-2 may differ responsive to unsynchronized triggering of the code generators 222-1 and 222-2. The triggering of the code generators 222-1 and 222-2 may be unsynchronized because the memory device 203 may receive commands not generated by the controller 202, leading to the triggering of the code generator 222-1 when the code generator 222-2 is not triggered.

The controller 202 can utilize the code generator 222-2 to generate a code that the controller 202 expects to receive from the memory device 203. The code compare component 228 can compare the code received from the memory device 203 to the code generated by the code generator 222-2 to determine whether the memory device 203 and the controller 202 are synchronized. The controller 202 may store a value in a register reflecting the synchronization determination. The result of the synchronization determination may be used to determine whether to continue to trust the memory device 203 and/or whether to refrain from trusting the memory device 203. In some instances, the synchronization determination may be presented to a user of the system comprising the memory device 203 and/or the controller 202 given that the memory device 203 and the controller 202 may be implemented in different computing devices.

The controller 202 may refrain from utilizing the memory device 203 based on a determination that the controller 202 and the memory device 203 are not synchronized. The controller 202 can continue to utilize the memory device 203 based on a determination that the controller 202 and the memory device 203 are synchronized. For example, the controller 202 may continue to store or read data from the memory device 203 based on a determination that the memory device 203 and the controller 202 are synchronized.

Although not shown, the device 202 can also be a different memory device. For example, the device 202 and the device 203 can both be memory devices. The memory device 202 can function as a controller such that the memory device 202 can provide the trigger to the memory device 203. Accordingly, the device 202 can include the trigger generator 230, the seed value 224-2, the code generator component 222-2 and the code compare component 228, regardless of whether the device 202 is implemented as control circuitry of a host or as a memory device independent of a host.

FIG. 3 is a block diagram of an apparatus in the form of a computing system comprising a memory device 303 and a controller 302 in accordance with a number of embodiments of the present disclosure. The memory device 303 and the controller 302 are analogous to the memory device 203 and the controller 202 in FIG. 2.

The memory device 303 comprises code generator 322-1, a register 324-1 to store a seed value referred to as a seed value 324-1, a command received decoder 326, mode registers 332 from the multipurpose registers (MPRs), and logic 334. The controller 302 comprises the code generator 322-2, a register 324-2 to store a seed value, code compare circuit 328, and a command generator 330. The memory device 303 and the controller 302 communicate via the address bus 304-1 and the command bus 304-2.

The command decoder 226 of FIG. 2 is analogous to the command decoder 326 and/or logic 334. The command decoder 226 can decode received commands (e.g., command decoder 326) and can determine whether the commands trigger the generation of a code via the randomization circuitry 322-1.

The command decoder 326 can be coupled to the logic 334. The logic 334 can determine whether to trigger the code generator 322-1. The logic 334 can receive information regarding a decoded command. In various examples, the logic 334 can receive the decoded command.

The logic 334 can access a standard by which to determine whether to trigger the decoding circuitry 322-1 from the mode registers 332. For instance, the logic 334 can access a counter used to track the quantity of commands received by the memory device 303. The mode registers can dictate what commands increment the code generator 322-1, how many of a given command trigger an incrementing of the code generator 322-1, a seed value, and/or how the seed value increments. Accordingly, the logic 332 can be coupled to the mode registers 332, the register 324-1 storing a seed value, and the code generator 322-1. The values stored in the mode registers 332 can be used to determine which command trigger the generation of the codes by the code generator 322-1. The logic 334 can be implemented as a multiplexer (MUX) to select which commands increment the code generator 322-1.

The logic 334 can also determine when to increment, modify, and/or reset the seed value. For example, to enhance security, the logic 332 may periodically modify the seed value instead of incrementing the code generator 322-1. The logic 334 can increment the seed value by any interval such as by one, by two, or by three among other possible intervals. The codes generated by the memory device 303 may exhibit a pattern that may be identified and replicated by a third device to generate appropriate codes. The third device may provide commands to the memory device 303 and codes to the controller 302 in an effort to fake synchronization. Modifying the seed value periodically and utilizing the seed value periodically to generate the codes can add an added level of security to prevent a different device from generating codes.

Triggering the code generator 322-1 can include incrementing the code generator 322-1. Incrementing the code generator 322-1 can include modifying a value stored by the code generator 322-1 used to generate a next state of the code generator 322-1 which can then be used to generate a code. The seed value 324-1 can be set and/or incremented by the logic 334. The controller 302 can provide commands to increment the seed value 324-1 and/or reset the seed value 324-1. The controller 302 can also provide a new seed value which can be stored in a register to update the seed value. Although not shown, the logic 334 and the mode registers 332 can be implemented in the controller 302 to allow the controller to generate a code that reflects synchronization with the memory device 303.

Figure 4:
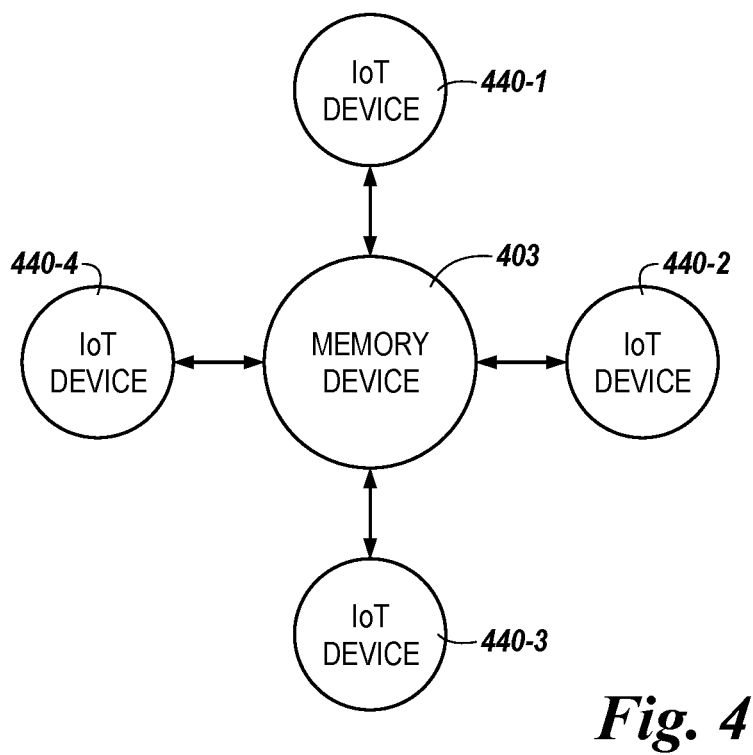
FIG. 4 illustrates an example system for variable code comparison in accordance with a number of embodiments of the present disclosure.
Figure 5:
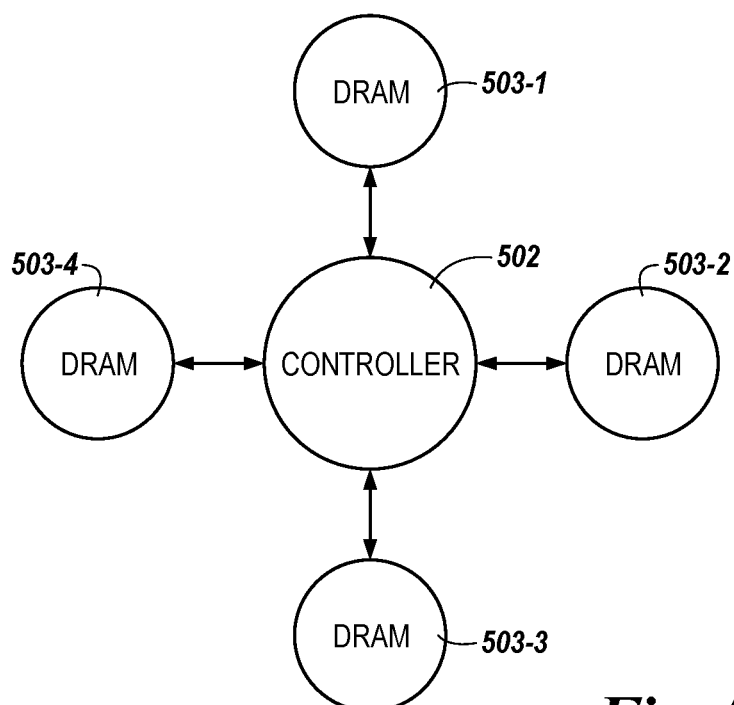
FIG. 5 illustrates an example system for variable code comparison in accordance with a number of embodiments of the present disclosure.
Figure 6:
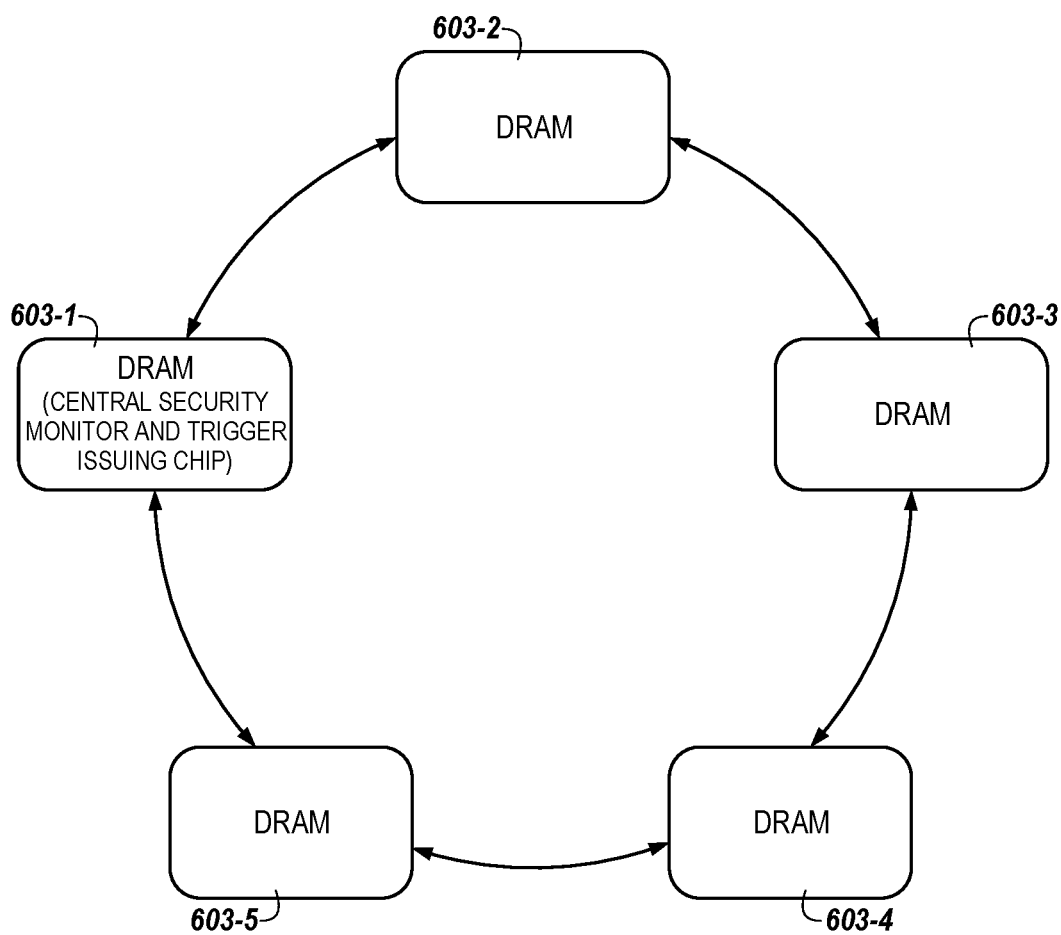
FIG. 6 illustrates an example system for variable code comparison in accordance with a number of embodiments of the present disclosure.

Although the synchronization is shown as taking place between a memory device and a host in FIGS. 1, 2, and 3, synchronization can occur between different devices as shown in FIGS. 4, 5, and 6. For examples, synchronization can occur between memory device and/or between non-memory device.

FIG. 4 illustrates an example system for variable code comparison in accordance with a number of embodiments of the present disclosure. The system includes internet of things (IOT) devices 440-1, 440-2, 440-3, and 440-4, referred to as IOT devices 440. The system also includes a memory device 403. The system of FIG. 4 can be a network system where the IOT devices 440 are coupled to the memory device 403 via a network. The system can further be described as a distributed network system where the IOT devices 440 can be coupled to each other via network connections.

As used here, an IOT device can include a network device. IOT can be devices comprising a sensor and used to communicate data gathered by the sensor. IOT device can perform a function such as gathering data and can utilize a network connection to store that data given that IOT device may have limited power capabilities, processing capabilities, and storage capabilities.

For example, the IOT devices 440 can gather data via one or more sensors and can store the data in memory external to the IOT devices 440. In various instances, the data can be provided to a memory device 403 via a network connection and/or a physical connection.

Accordingly, the memory device 403 may perform the functions described for the controller 202 and 302 in FIGS. 2 and 3 while the IOT devices 440 perform the functions described for the memory devices 203 and 303 in FIGS. 2 and 3.

In the example of FIG. 4, the memory device 403 can generate commands and provide the commands to the IOD devices 440 to confirm that the IOT devices 440 and the memory device 403 are synchronized. The IOT devices 440 can receive the command and generate a code from the code which they can provide to the memory device 403. The memory device 403 can compare the received codes to an internally generated code to determine if the IOT devices 440 can be trusted. The IOT devices 440 can be trusted if the IOT devices 440 and the memory device 403 are synchronized.

In various examples, the memory device 403 may generate commands for the IOT devices 440 even though the memory device 403 does not control the IOT devices 440 and even though the memory device 403 is used by the IOT devices 440.

The memory device 403 can maintain multiple states or a single state. For examples, the memory device 403 can be comprised of multiple instances of the code generator and/or multiple registers configured to store a plurality of seed values. The memory device 403 can maintain a different state (e.g., state of a code generator and a register to store the seed value) such that each state corresponds to a different IOT device. The memory device 403 can also maintain multiple states utilizing a plurality of instances of the code generator where each state is mapped to multiple of the IOT device. For instance, a first state of a first code generator and registers (e.g., seed value register) can be mapped to the IOT devices 440-1 and 440-2 while a second state of a second code generator and registers is mapped to the IOT devices 440-3 and 440-4.

Utilizing multiple different states of code generators provides the ability to synchronize multiple IOT devices 440 with a single memory device. Utilizing multiple different states of code generators also provides the ability to treat IOT devices 440 that are not synchronized with the memory device 403 differently than IOT devices 440 that are synchronized with the memory device 403.

In various examples, the memory device 403 can maintain a single state of a code generators for a plurality of IOT devices 440. For instance, the memory device 403 can provide a same code to each of the IOT device 440 to cause the states of the IOT devices 440 to change in unison. The memory device 403 can then verify a plurality of codes generated by the IOT device utilizing a single code generated internally to the IOT devices.

In examples where the IOT devices 440 control the memory device 403 and the memory device 403 verifies synchronization, the memory device 403 can cease providing services to the IOT devices 440 based on a determination that the IOT devices 440 are not synchronized with the memory device 403. For example, the memory device 403 can refrain from storing data and/or providing data to IOT devices that have been identified as not being synchronized. The memory device 403 can also store data and provide data to IOT devices 440 that are identified as being in synch with the memory device 403. Regardless of the actual synchronization determination, the memory device 403 can verify the synchronization of multiple IOT devices 440.

FIG. 5 illustrates an example system for variable code comparison in accordance with a number of embodiments of the present disclosure. The system of FIG. 5 includes a controller 502 and memory devices 503-1, 503-2, 503-3, and 503-4, referred to as memory devices 503. The system can be a computing system analogous to system 100 of FIG. 1.

The controller 502 can verify synchronization with the memory devices 503. The controller 502 can individually and independently verify synchronization with each of the memory devices 503. For example, the controller can verify synchronization with the memory device 503-1 independently of a synchronization verification conducted with the memory device 503-2. The synchronization verifications can be conducted concurrently and/or sequentially. For instance, the controller 502 can verify synchronization with the memory devices 503-1 and 503-2 concurrently or the controller 502 can verify synchronization with the memory device 503-1 before verifying synchronization with the memory device 503-2.

The controller 502 can maintain multiple instances of a code generator such that a code reflecting the state of each memory device 503 is generated using a different code generator. The controller 502 can also maintain a single instance of the code generator that generates a plurality of codes corresponding to the memory devices 503. For example, the seed values corresponding to the different memory devices 503-1 can be stored in registers and the values comprising the state of the code generator can also be stored in register. The seed values and any other values associated with the code register can be referred to as a context of the code generator. The controller 502 can store a different context corresponding to each of the memory devices 503. The controller 502 can generate a code corresponding to one of the memory devices 503 by loading a context corresponding to the one memory device in the code generator and generating a code based on the loaded context. The controller 502 can make any necessary changes to the context corresponding to the one memory device 503 prior to storing the context and loading a different context to generate a code for a different memory device 503.

In various examples, each of the memory devices 503 can each have a same state such that the memory devices 503 each generate a same code. The controller 502 can maintain a same state of the memory devices 503 by issuing the same commands and by programming each of the memory devices 503 to modify their states similarly. For instance, each of the memory devices 503 can trigger a code generator at a same time and based on the same receipt of the same commands.

FIG. 6 illustrates an example system for variable code comparison in accordance with a number of embodiments of the present disclosure. The system includes memory devices 603-1, 603-2, 603-3, 603-4, and 603-5, referred to as memory devices 603.

Unlike in FIGS. 1, 2, 3, and 5, there is no controller in the system of FIG. 6. The memory device 603 can function as a central security monitor and can trigger issuing chips.

The system of FIG. 6 is not centric to one memory device such as a controller and/or the memory device 403 of FIG. 4. The system of FIG. 6 relies on each of the memory devices 603 to verify their access synchronization with each other.

For instance, the memory device 603-1 can verify synchronization with the memory device 603-2. The memory device 603-2 can verify synchronization with the memory device 603-3. The memory device 603-3 can verify synchronization with the memory device 603-4. The memory device 603-4 can verify synchronization with the memory device 603-5. The memory device 603-5 can verify synchronization with the memory device 603-3.

Accordingly, the memory device 603-1 can maintain a context of the memory device 603-2 while the memory device 603-1 also has its own context. The memory device 603-2 can maintain a context of the memory device 603-3 while the memory device 603-2 also has its own context. The memory device 603-3 can maintain a context of the memory device 603-4 while the memory device 603-3 also has its own context. The memory device 603-4 can maintain a context of the memory device 603-5 while the memory device 603-4 also has its own context. The memory device 603-5 can maintain a context of the memory device 603-1 while the memory device 603-5 also has its own context.

Each of the memory devices 603 can generate multiple contexts utilizing multiple instances of a code generator or using a single instance of aa code generator and multiple contexts for the code generator. For example, the memory device 603-1 can maintain a first context and a second context for the code generator. The first context can correspond to a context of the memory device 603-1 while the second context can correspond to a context of the memory device 603-2. Each of the contexts can be used to program the code generator based on whether a code corresponding to the memory device 603-1 or the memory device 603-2 is desired. For instance, the memory device 603-1 can generate a code used to verify the synchronization with the memory device 603-2 utilizing the second context. The memory device 603-1 can generate a code used to verify its own state utilizing the first context.

The memory devices 603 can request codes describing the context of a different memory device 603 based on providing its own code corresponding to its own context. For instance, the memory device 603-2 can request a code of the memory device 603-3 responsive to having received a request for a code from the memory device 603-1. The memory device 603-2 can receive a request for a code corresponding to its own state. Responsive to providing the code to the memory device 603-1, the memory device 603-2 can request a code from the memory device 603-3. Synchronization verification can be performed sequentially such that a request to generate its own code can trigger a memory device to request a code from a different memory device.

The memory device 603-1 can initiate the verification chain such that the memory device 603-1 is the first to verify a code and the last to have its code verified. Although the synchronization verification is shown as being performed using incrementing labels (603-1, 603-2, 603-3 etc.), a number of different topologies can be used to perform a chain synchronization verification on a number of memory devices 603. For instance, the memory devices 603 can be divided into two groups and each of the groups can comprise a central security monitor memory device and the synchronization verification can be performed concurrently for the two different groups.

Figure 7:
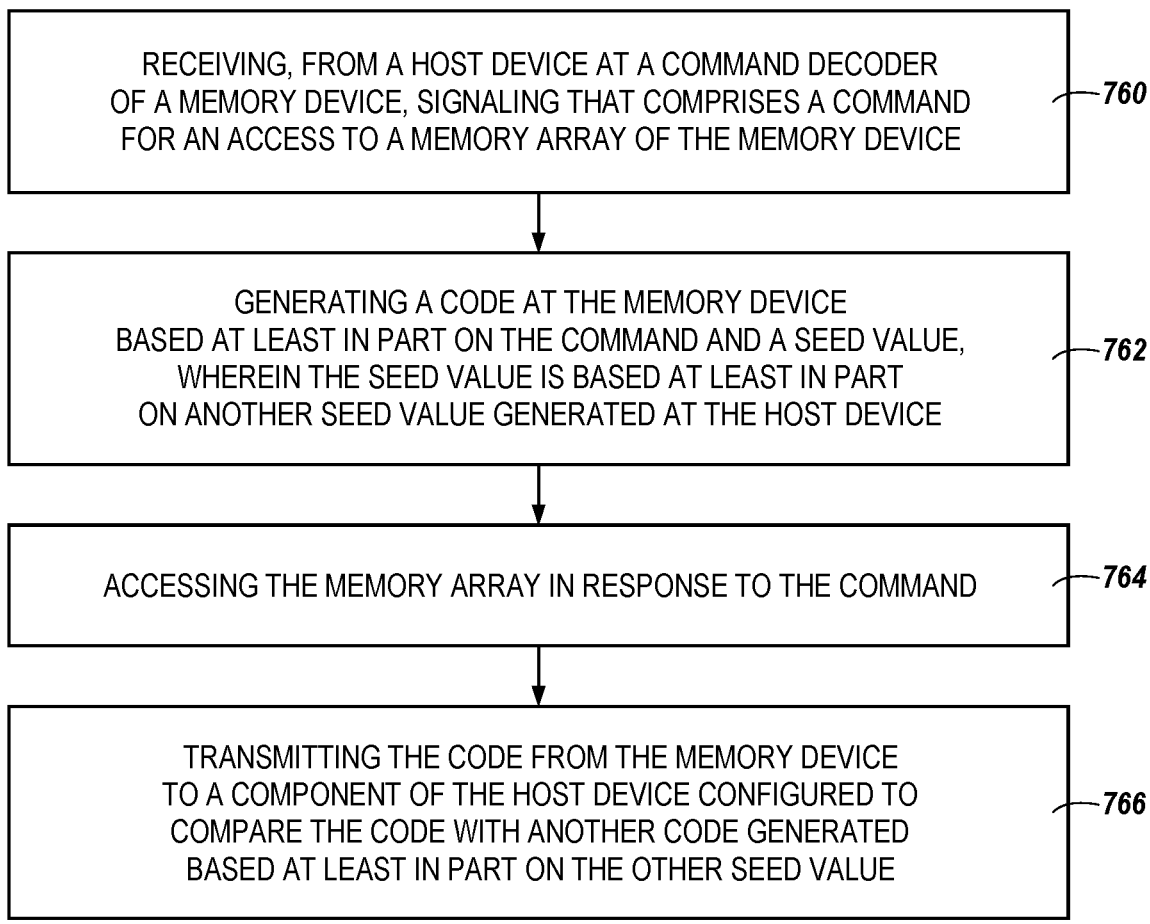
FIG. 7 illustrates an example flow diagram of a method for variable code comparison in accordance with a number of embodiments of the present disclosure.

FIG. 7 illustrates an example flow diagram of a method for variable code comparison in accordance with a number of embodiments of the present disclosure. At 760, a signal comprising a command for access to a memory array of a memory device can be received from a device. The device can be a host device. The command can be received at a command decoder of the memory device. The command can be a request to generate a code and/or can be any activation command, for example.

At 762, a code can be generated at the memory device. The code can be generated based at least on the command and a seed value. The seed value can be based at least in part on another seed value generated at the host device.

At 764, the memory device can be accessed in response to the command. For example, the signal can comprise an access command that can be used to provide access to the memory array of the memory device.

At 766, a code can be transmitted from the memory device to a component of the host device configured to compare the code with another code generated based at least on the other seed value. The comparison can be performed to determine whether a code generator that generated the code is synchronized with the component. The commands contributing to synchronization can modify the state of the code generators implemented by the memory device and the host device such that the commands contributing to synchronization can be coded into the code generated by the application.

The code generator of the memory device (e.g., first code generator) and the code generator of the host (e.g., second code generator) can be a same type of code generator configured to, for a same seed value, output a same updated code responsive to a same increment value associated with updating the first and second code generators. The first code generator and the second code generator can be linear feedback shift registers. Updating the output code values generated by the first and second code generators can comprise incrementing the linear feedback shift registers by a same amount.

In some examples, the second code generator can reside in a controller of the host and the first code generator can reside on a memory device. The seed value corresponding to the second code generator can be changed via circuitry on the controller. A command can be provided from the controller to the memory device to change the seed value corresponding to the second code generator such that the seed values corresponding to the first and the second code generators match.

Responsive to determining that the command is a command other than the trigger command, the updating of the code can be prevented. That is, the code may be updated if the command received is a trigger command.

In various examples, the device can be a first device that is coupled to a second device via a bus. The second device can comprise the second code generator. One or more registers on the second device can be programmed to set at least one of a trigger command, an amount by which the first and second code generators are adjusted responsive to the trigger command, a seed value for the first and the second code generators, and/or an amount by which the seed value is adjusted responsive to a command to adjust the seed value corresponding to the first and the second code generators.

A command can be classified as a trigger command responsive receipt of a threshold quantity of particular commands and/or receipt of a threshold quantity of all commands. For example, every $100^{th}$ read command can be identified as a trigger command or every $100^{th}$ command, regardless of the type of commands, can be identified as a trigger command. In various examples, the command can be a trigger command responsive to receipt of a threshold quantity of a plurality of particular commands. For example, the trigger can comprise a specific sequence of commands. The trigger can comprise the receipt of 10 read commands and 10 write commands, for example.

In various examples, an apparatus can comprise a first device comprising a first code generator and a second device comprising a second code generator. The second device can be configured to receive commands from the first device and update an output code value generated by the second code generator responsive to determining that a received command is a trigger command. The first device can be configured to update an output code value generated by the first code generator responsive to sending the trigger command. The apparatus can comprise a compare component configured to compare the updated output code values generated by the first and the second code generators to determine whether the first and the second code generators are synchronized.

In some instances, the first device can comprise the compare component. The compare component can be configured to store a result of a comparison of the updated output code values by setting a flag in a register of the apparatus.

The first device can be further configured to refrain from providing commands to the second device responsive to the flag indicating that the first and the second code generators are not synchronized. The first device can also be configured to continue providing commands to the second device responsive to the flag indicating that the first and the second code generators are synchronized.

Figure 8:
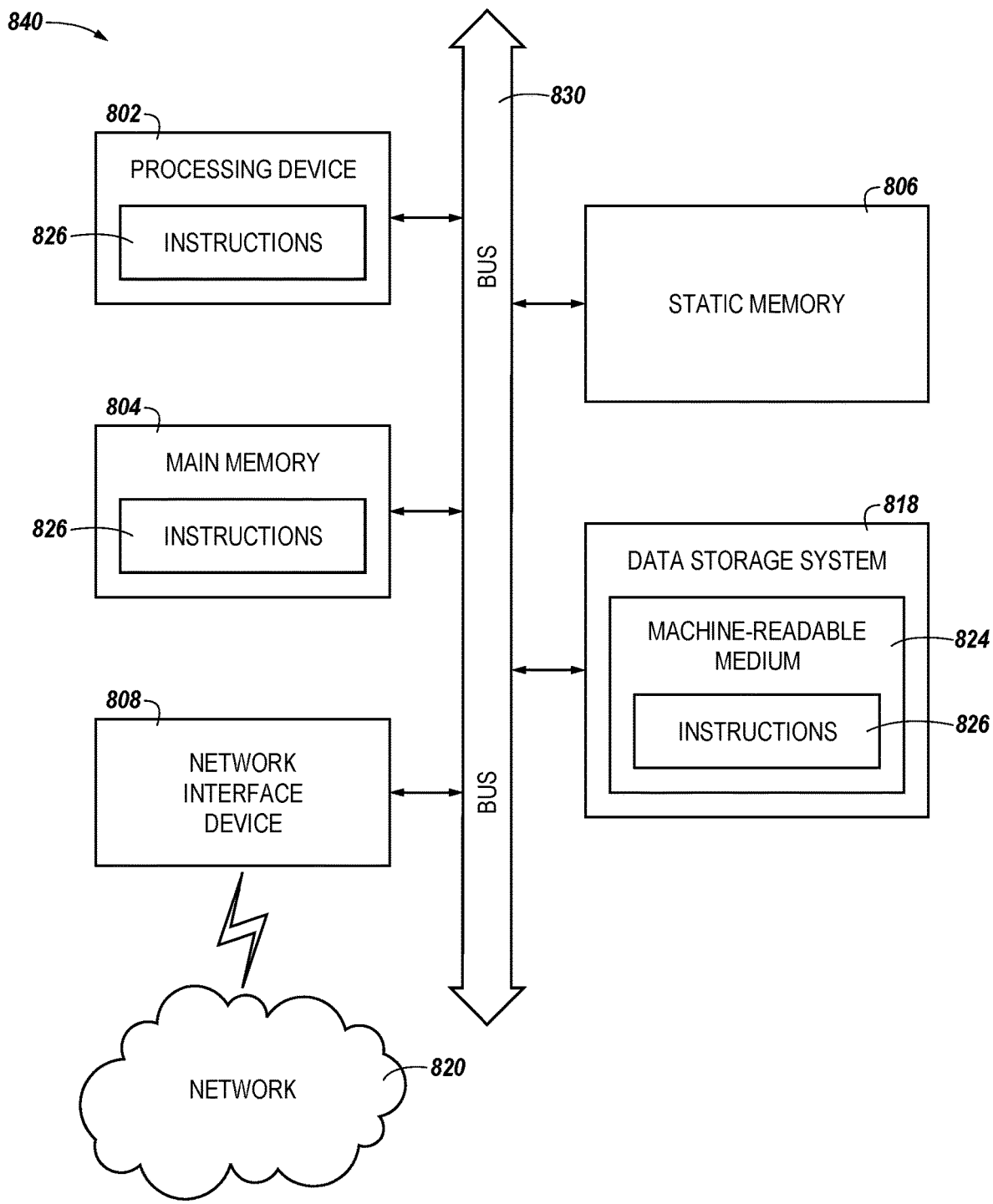
FIG. 8 illustrates an example machine of a computer system within which a set of instructions, for causing the machine to perform various methodologies discussed herein, can be executed.

FIG. 8 illustrates an example machine of a computer system 840 within which a set of instructions, for causing the machine to perform various methodologies discussed herein, can be executed. In various embodiments, the computer system 840 can correspond to a system (e.g., the system 100 of FIG. 1) that includes, is coupled to, or utilizes a memory sub-system (e.g., the memory device 103 of FIG. 1) or can be used to perform the operations of a controller (e.g., the controller 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 840 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 840 can further include a network interface device 808 to communicate over the network 820. The processing device may also be a controller among other types of device that can verify synchronization.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 840, the main memory 804 and the processing device 802 also constituting machine-readable storage media.

In one embodiment, the instructions 826 include instructions to implement functionality corresponding to the controller 102 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a trigger generator, comprising hardware, configured to cause an access command to be transmitted to a memory device, wherein the access command is a read command or write command;
   a code generator, comprising hardware, configured to:
      update a state of the code generator of a host based on causing the access command to be transmitted;
      update an output code responsive to transmitting the access command and based on the state of the code generator;
   a compare component, comprising hardware, configured to compare the output code with a different code generated by a different code generator of the memory device to determine whether the state of the code generator is synchronized with a different state of the different code generator,
      wherein the apparatus that transmits the access command also compares the output code to the different code received from the memory device; and
   a processing resource of the host configured to provide additional commands to the memory device responsive to determining that the state of the code generator is synchronized with the different state of the different code generator of the memory device.

2. The apparatus of claim 1, wherein the compare component is further configured to store a result of a comparison of the updated output code and the different code by setting a flag in a register of the apparatus.

3. The apparatus of claim 1, wherein the memory device is a first memory device, and wherein the trigger generator and the code generator are located on a different memory device of the apparatus.

4. The apparatus of claim 1, wherein the apparatus is further configured to:
refrain from providing commands to the memory device responsive to a flag indicating that the code generator and the different code generator are not synchronized; and
continue providing commands to the memory device responsive to the flag indicating that the code generator and the different code generator are synchronized.

5. The apparatus of claim 1, wherein the code generator is a linear-feedback shift register (LFSR).

6. The apparatus of claim 1, wherein the code generator is further configured to generate the output code by randomizing a seed value.

7. The apparatus of claim 1, wherein the compare component is further configured to compare the output code and the different code to determine whether the memory device has received unauthorized commands.

8. A method, comprising:
receiving, from a host device at a command decoder of a memory device, signaling that comprises a threshold quantity of commands for an access to a memory array of the memory device;
updating a state of a code generator of the memory device based on receipt of the threshold quantity of commands;
generating a code at the code generator of the memory device based at least in part on the state and a seed value, wherein the seed value is based at least in part on another seed value generated at the host device;
accessing the memory array in response to at least one of the threshold quantity of commands;
transmitting the code from the memory device to a component of the host device configured to compare the code with another code generated, at a different code generator of the host device, and based at least in part on the other seed value to determine whether the state of the code generator is synchronized with a different state of the different code generator, and
wherein the memory device does not perform a comparison of the code to the different code,
wherein the memory device accesses the memory array regardless of a result of the comparison, and
wherein the memory device is a receiving device; and
receiving additional commands from the host responsive to the state of the code generator being synchronized with the different state of the different code generate of the host.

9. The method of claim 8, wherein the transmitting further comprises transmitting the code via an address interface.

10. The method of claim 8, further comprising receiving the seed value from the host device, wherein the seed value is used to generate the code and the another code.

11. The method of claim 8, further comprising synchronizing the code with the another code generated by the component by generating the code at the memory device.

12. The method of claim 8, further comprising incrementing a linear feedback shift register to generate the code.

13. The method of claim 8, wherein the method further comprises:
receiving an updated seed value from the host device; and
updating the seed value with the updated seed value responsive to receipt of a command from the host device to update the seed value, wherein the seed value is updated to synchronize the seed value with the other seed value corresponding to the host device.

14. The method of claim 8, further comprising preventing a generation of the code responsive to determining that the signaling does not comprise a trigger command.

15. The method of claim 14, further comprising programming one or more registers on the second device to set at least one of:
the trigger command;
an amount by which the code is adjusted responsive to the trigger command;
the seed value; or
an amount by which the seed value is adjusted responsive to a command to adjust the seed value.

16. The method of claim 8, further comprising determining that the command is a trigger command responsive to at least one of:
receipt of a threshold quantity of a particular command; or
receipt of a threshold quantity of all commands.

17. The method of claim 10, further comprising determining that the command is a trigger command responsive to receipt of a threshold quantity of a plurality of particular commands.

18. An apparatus, comprising:
circuitry configured to provide a threshold quantity of a plurality of particular commands to a receiving device;
a code generator, comprising hardware, configured to:
update a state of the code generator of the host based on providing the threshold quantity of the plurality of particular commands;
generate a code responsive to providing the threshold quantity of the plurality of particular commands and based on the state;
a code compare component, comprising hardware, configured to:
receive a different code generated at a different code generator of the receiving device;
determine that the code matches the different code to determine that an intrusion has not occurred in the receiving device by determining that the state of the code generator is synchronized with a different state of the different code generator;
responsive to determining that the first code does not match the second code, determine that an intrusion has occurred; and
wherein the circuitry of the host is further configured to provide additional commands to the receiving device responsive to determining that the code matches the different code; and
wherein the apparatus that transmits the threshold quantity of the plurality of particular commands also compares the first code to the second code received from the receiving device.

19. The apparatus of claim 18, wherein the receiving device is an internet of things (IOT) device.

20. The apparatus of claim 18, wherein the receiving device is a memory device and the apparatus is the host.

* * * * *